(12) United States Patent
Raghavan et al.

(10) Patent No.: US 12,190,125 B2
(45) Date of Patent: Jan. 7, 2025

(54) PERFORMANCE TUNING A COMPUTER SYSTEM IN SCALING DOMAINS BASED ON QUANTIFIED SCALABILITY

(71) Applicant: EMC IP Holding Company LLC, Hopkinton, MA (US)

(72) Inventors: Rasa Raghavan, Verona, WI (US); Steve A. Morley, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 18/105,761

(22) Filed: Feb. 3, 2023

(65) Prior Publication Data

US 2024/0264846 A1 Aug. 8, 2024

(51) Int. Cl.
*G06F 9/00* (2018.01)
*G06F 9/445* (2018.01)

(52) U.S. Cl.
CPC ................ *G06F 9/44505* (2013.01)

(58) Field of Classification Search
None
See application file for complete search history.

(56) References Cited

U.S. PATENT DOCUMENTS

| | | | | |
|---|---|---|---|---|
| 9,465,632 | B2* | 10/2016 | Ebcioglu | ............. G06F 9/45533 |
| 2004/0006584 | A1* | 1/2004 | Vandeweerd | ........... G06F 30/33 |
| | | | | 718/107 |
| 2004/0015978 | A1* | 1/2004 | Orii | ..................... G06F 11/3447 |
| | | | | 714/E11.197 |
| 2016/0328273 | A1* | 11/2016 | Molka | ...................... A61B 8/00 |
| 2021/0216330 | A1* | 7/2021 | Raghavan | ........... G06F 9/44505 |
| 2023/0161483 | A1* | 5/2023 | Kinsey | ................ G06F 11/1076 |
| | | | | 714/763 |

* cited by examiner

*Primary Examiner* — Nitin C Patel
(74) *Attorney, Agent, or Firm* — Krishnendu Gupta; Deepika Bhayana; Derek Lam (57) ABSTRACT

Systems and methods for performance tuning a computer system in scaling domains based on quantified scalability. A system includes a processor configured to: calculate an estimate of parallel fraction and speedup characteristic in a first domain D1 and in a second domain D2 for an application, the estimate being calculated using system performance measurements generated from previous processing iterations of one or more workloads of the application using a number, n, of cores in the first domain and a remaining number, N−n, of cores in the second domain to obtain performance values $X_{D1}(n)$ and $X_{D2}(N-n)$, wherein N represents a total number of cores; calculate the number of cores for the first domain using a quadratic equation generated from the parallel fraction and performance value in each domain; and execute the application in each domain using the number of cores for each domain.

20 Claims, 7 Drawing Sheets

PERFORMANCE TUNING A COMPUTER SYSTEM IN SCALING DOMAINS BASED ON QUANTIFIED SCALABILITY

FIELD

Example embodiments generally relate to performance tuning of computer systems. More specifically, at least some embodiments relate to systems, hardware, software, computer-readable media, and methods for tuning performance of a computer system in scaling domains using quantified scalability.

BACKGROUND

Resource scaling is an important challenge facing developers. Modern CPU designers often increase performance by placing more and more cores onto the same die. However, increased core counts do not automatically improve performance since multiple cores will be useful only if system code is designed to be scalable.

SUMMARY

In one embodiment, a system comprises at least one processing device including a processor coupled to a memory. The at least one processing device can be configured to implement the following steps: calculating an estimate of parallel fraction and speedup characteristic in a first scaling domain D1 and in a second scaling domain D2 for an application executed by a computer system, the estimate being calculated using system performance measurements generated from previous processing iterations of one or more workloads of the application using a number, n, of CPU cores in the first scaling domain and a remaining number, N−n, of CPU cores in the second scaling domain to obtain corresponding performance values $X_{D1}(n)$ and $X_{D2}(N-n)$, wherein N represents a total number of CPU cores; calculating the number of CPU cores for the first scaling domain, the number of CPU cores being calculated using a quadratic equation generated from the parallel fraction and performance value in each scaling domain; and executing the application in each scaling domain using the number of CPU cores for each scaling domain.

In some embodiments, the performance value for the first scaling domain $X_{D1}(n)$ can be determined based on system performance measurements including the parallel fraction for the first scaling domain and the single core performance value for the first scaling domain $X_{D1}(1)$. The performance value for the second scaling domain $X_{D2}(N-n)$ can be determined based on system performance measurements including the parallel fraction for the second scaling domain and the single core performance value for the second scaling domain $X_{D2}(1)$. The quadratic equation can relate the single core performance value for the first scaling domain with n number of cores allocated, to the single core performance value for the second scaling domain with the remaining number N−n of cores allocated. The quadratic equation can yield at most two quadratic solutions, and the number of CPU cores for the first scaling domain can be calculated based on the quadratic solution that is between 0 and the total number N of CPU cores. The estimate can be calculated using linear regression of values $(1/n, 1/X_D(n))$ generated from trial runs of the application in a given scaling domain D. Calculating the estimate of parallel fraction and speedup characteristic can be based on an expression relating speedup to an inverse of a parallel fraction for the application in a given scaling domain. The parallel fraction can be a fraction of the application that can be executed in parallel. Calculating the estimate of parallel fraction and speedup characteristic can be further based on an inversion of the expression that yields a linear expression for $1/X_D(n)$ in terms of $1/n$. The linear expression can have slope and intercept values identified by the linear regression and used in substitution calculations to obtain the parallel fraction and a single-core performance value in a given scaling domain D. The substitution calculations include (1) calculating the single-core performance value as $1/(m+b)$, m being the slope value and b being the intercept value, and (2) calculating the parallel fractions as $m/(m+b)$. The parallel fractions in the first and the second scaling domains are estimated using system performance measurements generated from trial runs of the application processing the workloads by selecting a fixed number of CPU cores in a given scaling domain and varying the remaining number of CPU cores in the other scaling domain to obtain the parallel fraction in the other scaling domain. The performance values can be values of input/output operations per second (IOPS) as a performance metric for the application. The performance values $X_{D1}(n)$ and $X_{D2}(N-n)$ can be scaled values calculated by normalizing raw performance values with respect to CPU utilization achieved in the respective scaling domains during respective trials of the application. The CPU cores can include a plurality of cores in one or more CPUs. The calculated number of CPU cores can represent an optimal number of CPU cores for the first scaling domain.

Other example embodiments include, without limitation, apparatus, systems, methods, and computer program products comprising computer-readable storage media.

Other aspects of the invention will be apparent from the following description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

To easily identify the discussion of any particular element or act, the most significant digit or digits in a reference number refer to the figure number in which that element is first introduced.

In the drawings.

DETAILED DESCRIPTION

Example embodiments generally relate to performance tuning of computer systems. More specifically, at least some embodiments relate to systems, hardware, software, computer-readable media, and methods for tuning performance of a computer system in scaling domains using quantified scalability.

Disclosed herein are techniques for CPU core partitioning into scaling domains to improve system performance. The present approach leverages techniques for quantifying system scalability based on system performance measurements and linear regression. In example embodiments, estimates of parallel fractions and speedup characteristics can be calculated in a first scaling domain D1 and a second scaling domain D2 for an application, to obtain corresponding performance values $X_{D1}(n)$ and $X_{D2}(N-n)$, where N represents a total number of CPU cores, n represents a number of CPU cores in the first scaling domain, and N−n represents a remaining number of CPU cores in the second scaling domain. A number of CPU cores for the first scaling domain can be calculated, for example using a quadratic equation generated from the parallel fraction and performance value in each scaling domain. The application can be executed in each scaling domain using the number of CPU cores for each scaling domain.

As used herein, "cores" generally refer to distinct processing elements, a number of which are included on a multi-core CPU, and which are connected for shared access to memory and are generally treated as allocable resources such as by resource-management code of applications and operating systems. A core generally represents the basic computation unit of the CPU. A CPU may have one or more cores configurable to execute work. Modern servers may have one or more CPUs.

Resource scaling is a serious challenge facing software developers. Modern CPU designers often increase performance by placing more and more cores onto the same die. However, this does not automatically improve performance since multiple cores will be useful only if system code is designed to be scalable. While there is an art to developing systems to be maximally scalable, another aspect that confronts system architects and developers is to be able to quantify performance enhancement achievable from scaling in practice. Such quantification can provide an objective basis for exploring cost-performance tradeoffs as well as opportunities for fine tuning performance.

Thus, techniques are described herein for core partitioning into scaling domains to improve system performance. The approach leverages techniques for quantifying system scalability based on system performance measurements and linear regression. The results provide quantitative measures for tracking progress in system performance tuning as well as other purposes, such as system performance modeling for example.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

System Architecture

Figure 1:
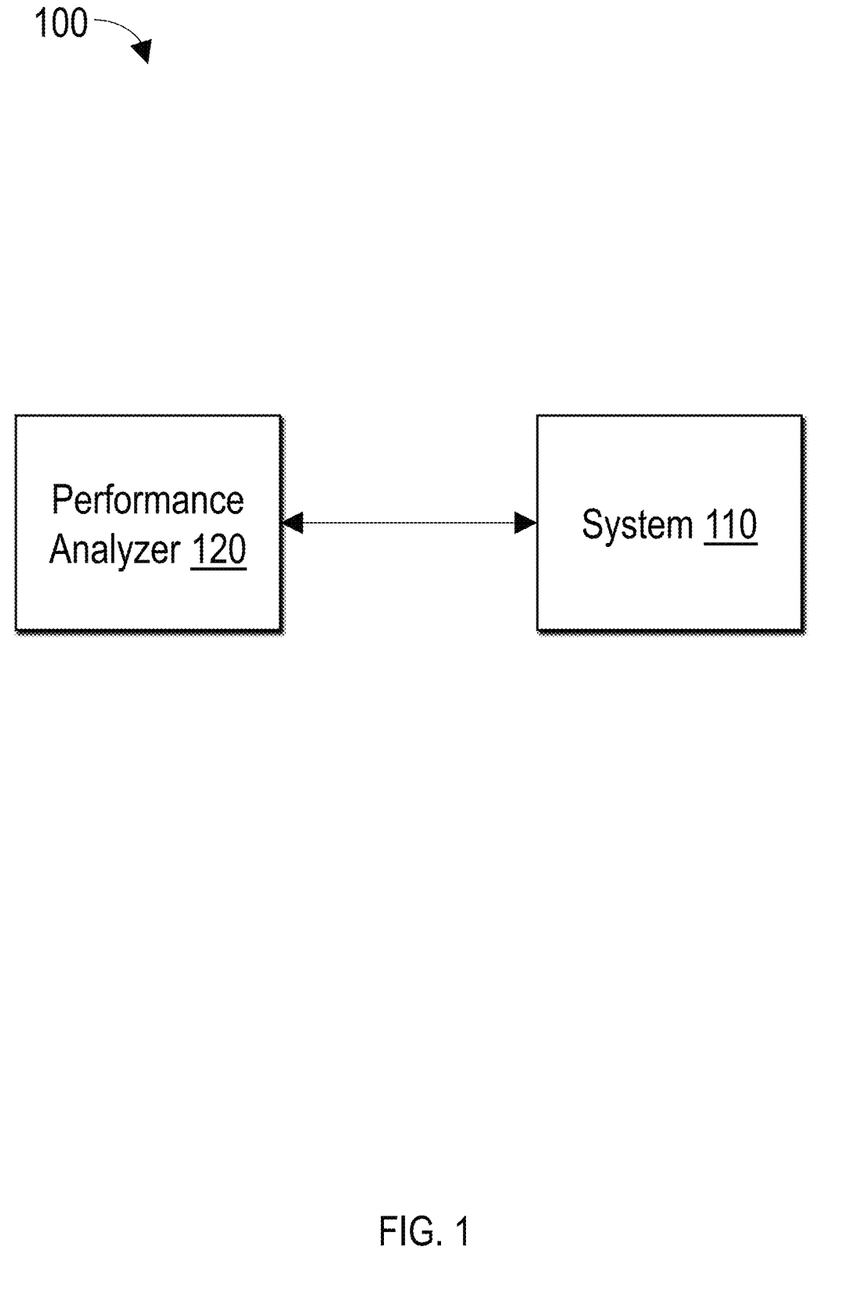
FIGS. 1-2 illustrate aspects of a computer system, in accordance with example embodiments.

FIG. 1 is a block diagram of a system 100, in accordance with example embodiments. For example, the system 100 includes one or more systems 110 and a performance analyzer 120. In operation, a system 110 provides computing resources (e.g., CPU cores, input/output (I/O) processing, data storage, and the like) to separate computers (e.g., server computers, not shown) as clients. The performance analyzer 120 is a specialized computerized system that provides performance-related analysis of operation of a system 110 and generates analysis results used in configuring the systems 110 for tuned performance, as described more below.

As a computerized system, the performance analyzer 120 has computer hardware including one or more processors, memory, and data interconnections such as one or more high-speed data buses (not specifically shown), and in operation the memory stores data and instructions of a performance analysis program which are executed by the processor(s) to cause the hardware to function in a software-defined manner. The performance application analysis program may be stored on non-transitory computer-readable medium such as an optical or magnetic disk, flash memory or other non-volatile semiconductor memory, etc., from which it is retrieved for execution by the processing circuitry, as generally known in the art.

In the illustrated arrangement, the performance analyzer 120 is separate from the system 110, and in this case may be embodied in a standalone computer (e.g., desktop or server) having communications connections to the system 110. In some embodiments, a performance analyzer may be incorporated into a system 110, typically sharing computer hardware and using internal communication mechanisms. Also, while FIG. 1 suggests a real-time connection between the performance analyzer 120 and system 110, such as a network conveying communications between these components as their operations occur concurrently, in fact the connection may have a temporal component as well, such that a performance analysis occurs at a first time T1 while related operation of a system 110 occurs at a different time T2. Thus in one case a performance analysis can occur as early as during a product design phase, for example, while the analysis results are used for an eventual configuring of a system 110 in a later production or deployment phase. Other operation scenarios are also contemplated.

Figure 2:
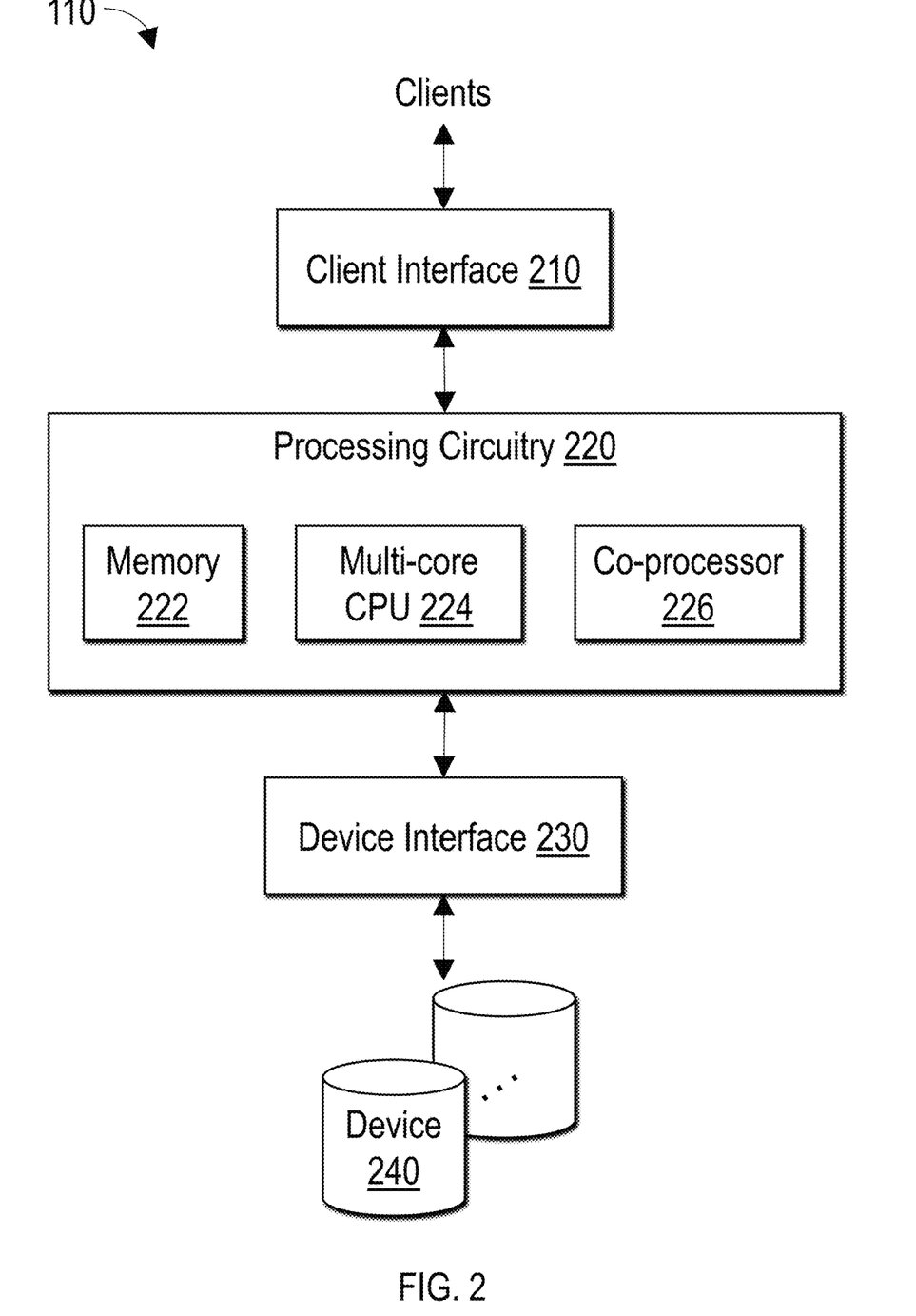

FIG. 2 shows an example system 110. For example, the system 110 includes client interface circuitry 210, processing circuitry 220, device interface circuitry 230, and data storage devices 240. The client interface circuitry 210 provides an interface to a data network such as a storage area network (SAN), TCP/IP network, etc., with the clients storing data and accessing stored data by issuing corresponding storage write and read requests over the network to the system 110. In one embodiment the system 110 is realized as a so-called network-attached storage or NAS device, supporting one or more network file system protocols. In other embodiments the system 110 may provide storage as logical or virtualized devices or volumes, using a storage-oriented protocol such as Fibre Channel or iSCSI. In operation, storage requests are received by the client interface circuitry 210 and satisfied by operation of the remaining components.

As shown, the processing circuitry 220 includes a multi-core CPU 224, memory 222, and a co-processor 226, such as a data compression engine for example. Although one multi-core CPU 224, one memory 222, and one co-processor 226 are illustrated, in alternate embodiments the processing circuitry 220 can include more than one multi-core CPU 224, memory 222, and co-processor 226. The CPU 224 executes instructions of an application (not shown), which are stored in and retrieved from memory 222 during execution after being retrieved from separate non-volatile storage such as disk or flash. As generally known, the application is responsible for myriad functional aspects of operation, including the management of resources and coordination of concurrent activities (e.g., handling multiple client I/O requests and back-end accesses concurrently), managing of internal file systems and other specialized data/functions providing a logical view of stored data to the clients, handling error conditions, etc.

In some embodiments, the disclosed technique is specifically directed to the use of the multi-core CPU 224 by the application. As generally known, a multi-core CPU includes a number of distinct processing elements, called "cores," which are connected for shared access to the memory 222 and are treated as allocable resources by resource-management code of the application. For ease of discussion, the present disclosure presumes the cores as partitioned by the present techniques are substantially equivalent in terms of relevant specifications (e.g., symmetrical). A typical modern CPU may have on the order of 20 or more cores, for example, and in the near future may be scalable to hundreds of cores. Use of independent cores can increase performance by parallel execution of distinct operations. For a data storage system in particular, parallelization may be based on one or more of the following as examples:

(1) separating I/O requests of different clients and/or different devices 240,
(2) separating I/O requests by stage of completion, e.g., front-end, cache, back-end,
(3) separating operations by coarse function, e.g., dedicating some cores to certain background processes (such as rebuilds or cache management) while using other cores for handling client I/O.

In the remaining description, the application, which in some embodiments can be a data storage application, is described in terms of its ability to be "parallelized," e.g., to have parts of it be executed in parallel. This feature is also referred to as "parallelizability" and represented via a parameter called "parallel fraction". Although no specific code examples are given, those skilled in the art will understand that parallelizability depends on both the general nature of the data storage application (e.g., general independence of operations) as well as its implementation (e.g., use of shared structures), and thus in general an application can be adjusted by suitable modification of code to reduce serial dependencies. For any given instance of an actual application, specific features of the code contribute to its parallelizability and parallel fraction. The description below refers to parallel fraction as an abstract parameter that can be derived from measurements and analysis. It will be understood that in a real system the parallel fraction as measured arises from, and in a sense represents, the nature of the application as well as its detailed implementation. Some applications are inherently more parallelizable than others, and some implementations of a given application are more parallelizable than others.

Core Partitioning

Figure 3:
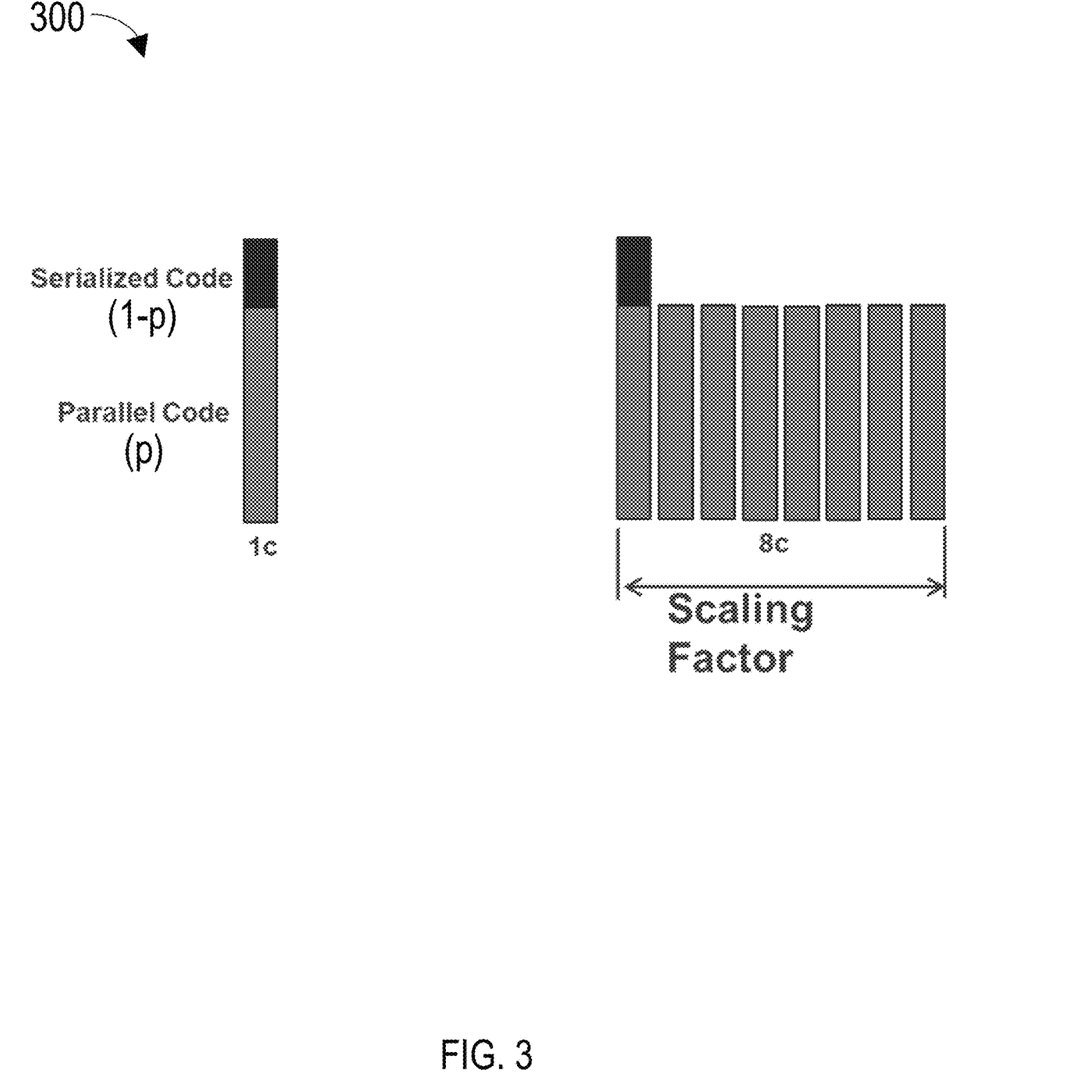
FIG. 3 illustrates aspects of a scaling of application execution having a given amount of serial code, in accordance with example embodiments.

FIG. 3 illustrates an aspect of scalability or parallelization as discussed herein. Generally, parallelization of computer code across multiple CPUs (or cores) allows a system (e.g., system 110) to accomplish more work in a given time period or complete a given task faster. However, practical limits on scaling can arise due to the nature of the code. At two logical extremes, code may be strictly serial (always requiring completion of one task before beginning another) or infinitely parallelizable (no interdependence among tasks). Real-world applications fall somewhere in between. FIG. 3 is an abstract illustration 300 of the general case, in which an application has a fraction p of parallel code and a remaining fraction (1−p) of serial code. FIG. 3 illustrates the amount of work that can be accomplished with eight CPU cores (right side) compared to one CPU core (left side). Inevitably system code has a portion that is inherently serialized (e.g., sequential or unscalable) and a portion that is parallelizable (or scalable). The larger the parallelizable portion of the code (parallel fraction), the higher the system performance speedup.

System speedup due to scaling of computational resources can be estimated by analysis as follows. Suppose the amount of time to complete a task on a single core is T, and that a parallelizable part of the task (parallel fraction) is p; i.e., it will take pT/N amount of time to complete that part of the task on N cores. The rest of the task is not parallelizable, and it will take (1−p)T amount of time independent of the number of cores involved. The time to complete a task with N cores is the sum of the two:

$$p\frac{T}{N} + (1-p)T \qquad (1)$$

The speedup for N cores, S(N), is the ratio of time to complete a task on one core, to time to complete a task on N cores:

$$S(N) = \frac{T(1)}{T(N)} = \frac{T(1)}{\frac{pT(1)}{N} + (1-p)T(1)} = \frac{1}{\frac{p}{N} + (1-p)} = \frac{N}{p + (1-p)N} \qquad (2)$$

Equation (2) is known as Amdahl's Law.

Figure 4:
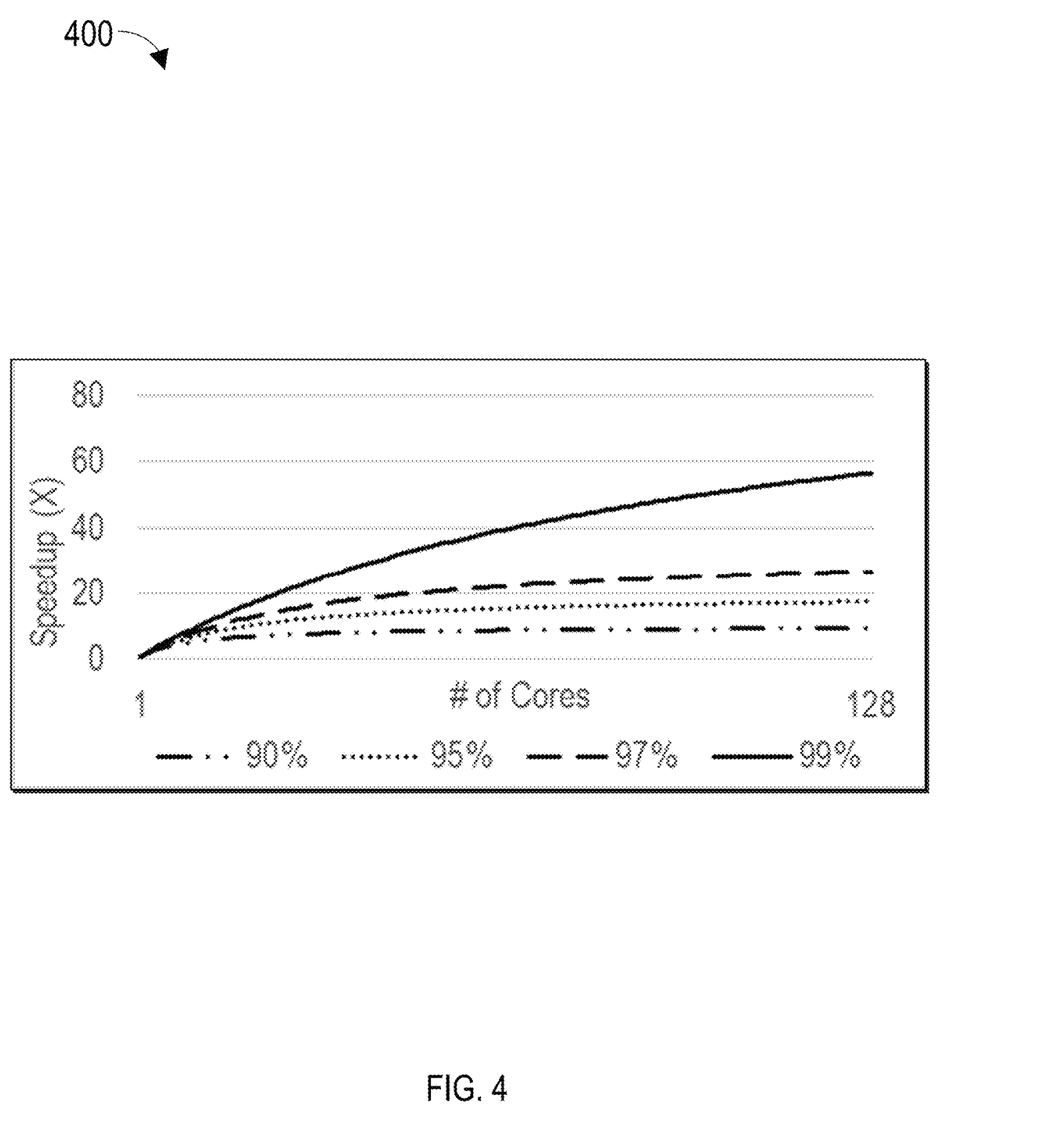
FIG. 4 illustrates a plot of speedup characteristics (e.g., speedup versus n) for different values of a parallel fraction p, in accordance with example embodiments.

For example, FIG. 4 shows characteristics 400 of system speedup (e.g., speedup characteristics) for various parallel fractions p. As seen in FIG. 4, the speedup curve for each value of p extends toward a respective asymptote value of 1/(1−p), and thus the speedup characteristic for the application is generally sensitive to the value of p.

More particularly, FIG. 4 illustrates a chart 400 of system speedup characteristics for various parallel fractions. It is appreciated that the speedup (X) is very sensitive to the value of the parallel fraction (p) generally, and accordingly chart 400 shows that additional CPU cores may not have much impact on system performance unless the parallel fraction is very high.

It is further appreciated that multi-core CPUs (such as multi-core CPU 224) will be scaling to hundreds of cores in short order. Thus, conventional monolithic symmetrical multiprocessor systems that distribute work across all CPU cores are approaching a point of diminishing returns.

Partitioning large monolithic systems can improve efficiency and scalability by decomposing data and/or functions into smaller independent compute domains. For example, many cloud service providers have/are modernizing by shifting from large monolithic systems to loosely coupled microservices. The challenge is balancing resources assigned to each component to avoid introducing bottlenecks. Disclosed herein are techniques for core partitioning into two independent core scaling domains to improve system performance.

In general, for a given scaling domain D, scalability and speedup characteristics can be derived based on measurements of basic system performance using, for example, linear regression. Example system performance measurements can include system measurements taken from trial runs of an application in the given scaling domain for various numbers n of CPU cores used during the trial runs. Example scalability and speedup characteristics can include, without limitation, the performance value $X_D(n)$ for the number n of CPU cores in the given domain D and the parallel fraction pp for the given domain.

In example embodiments, an estimate of parallel fraction (p) and speedup characteristic is calculated in a given scaling domain D using linear regression of values $(1/n, 1/X_D(n))$ generated from trial runs of an application executed by a computer system in domain D. Calculating the estimate of parallel fraction and speedup characteristic can be based on an expression relating speedup to an inverse of a parallel fraction for the application in domain D. Calculating the estimate of parallel fraction and speedup characteristic can be based on an inversion of the expression that yields a linear expression for $1/X_D(n)$ in terms of $1/n$. The linear expression can have slope (m) and intercept values (b) identified by the linear regression and used in substitution calculations to obtain the parallel fraction, pp, and a single-core performance value in domain D, $X_D(1)$. For example, the substitution calculations can include (1) calculating the single-core performance value $X_D(1)$ as $1/(m+b)$, m being the slope value and b being the intercept value, and (2) calculating the parallel fraction $p_D$ as $m/(m+b)$. In some embodiments, the performance values can be values of input/output operations per second (IOPS) as a performance metric for the application. For example, the performance values $X_{D1}(n)$ and $X_{D2}(N-n)$ in the first and second scaling domains can be scaled values calculated by normalizing raw performance values with respect to CPU utilization achieved in the respective scaling domains during the respective trials.

The parallel fractions in the first and the second scaling domains, $p_{D1}$ and $p_{D2}$, can be estimated using system performance measurements generated from trial runs of the application processing the workloads by selecting a fixed number of CPU cores in a given scaling domain and varying the remaining number of CPU cores in the other scaling domain to obtain the parallel fraction in the other scaling domain. For example, trial runs of application processing can be performed while the number of CPU cores is fixed in Domain 1, and the remaining number of CPU cores is varied in Domain 2, for example from 1 to 128, to obtain the parallel fraction for the second scaling domain, $p_{D2}$. Similarly, trial runs of application processing can be performed while the number of CPU cores is fixed in Domain 2, and the remaining number of CPU cores is varied in Domain 1, for example from 1 to 256, to obtain the parallel fraction for the first scaling domain, $p_{D1}$.

Further detail regarding approaches for determining scalability and speedup characteristics including the performance value and parallel fraction $(X_D(n), p_D)$ are disclosed in U.S. Pat. No. 11,416,265 entitled "PERFORMANCE TUNING A DATA STORAGE SYSTEM BASED ON QUANTIFIED SCALABILITY" and filed Jan. 15, 2020, the contents of which are incorporated by reference herein in their entirety for all purposes.

Figure 5:
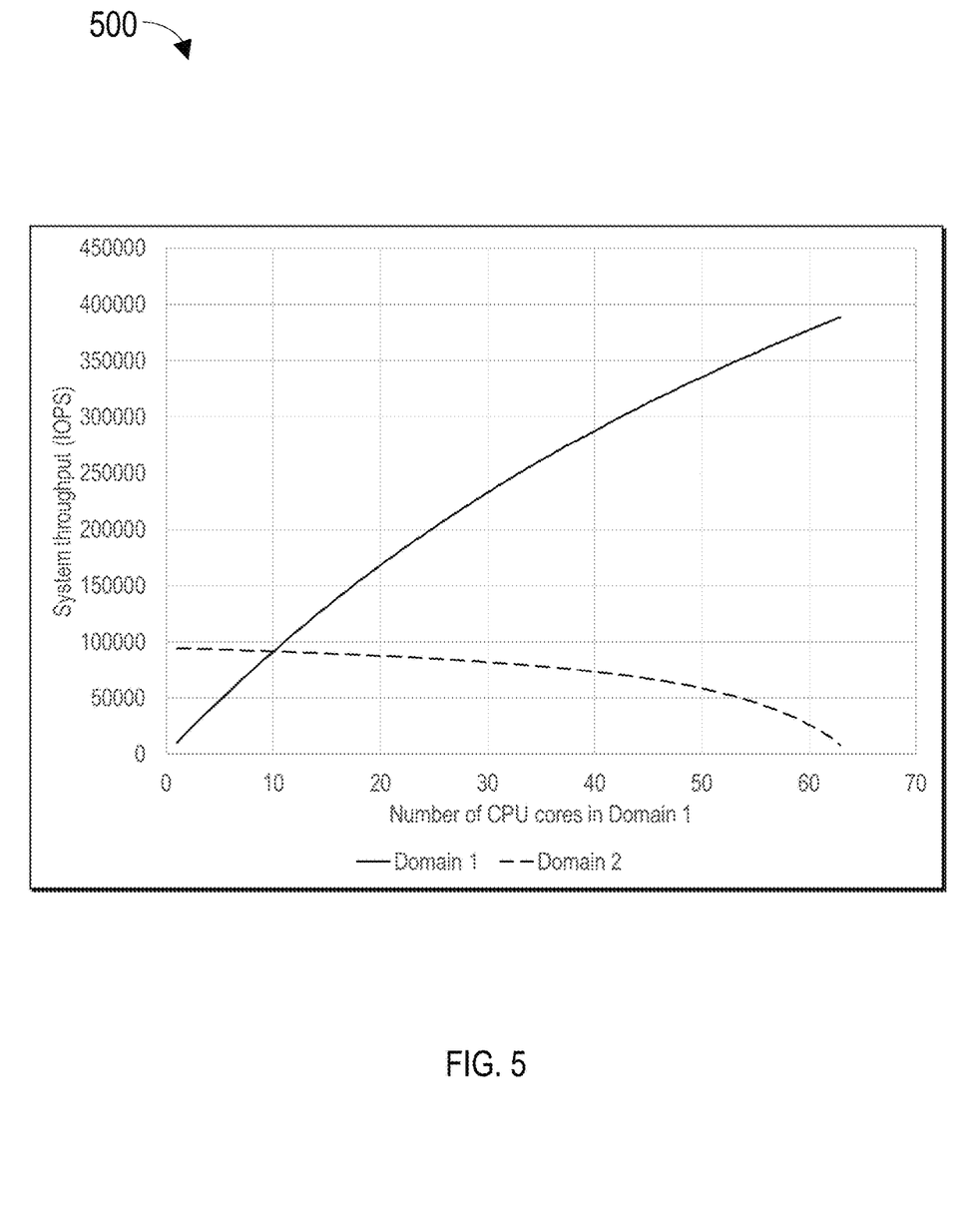
FIG. 5 illustrates a plot of system throughput based on a count of CPU cores allocated to a first and second scaling domain, in accordance with example embodiments.

FIG. 5 shows a plot 500 of system throughput based on a count of CPU cores allocated to a first and second scaling domain.

The plot 500 illustrates how expected system throughput can vary based on the number n of CPU cores allocated to a first scaling domain, Domain 1, assuming that the remaining number, N−n, CPU cores are allocated to a second scaling domain, Domain 2, where N represents a total number of CPU cores available.

The present technique presumes that Amdahl's law applies to system performance, and that various measurements of basic system performance are readily available, as described in greater detail herein. Assume that a single IO request uses some compute resources on CPU cores in Domain 1 and some compute resources on CPU cores of Domain 2. As used herein, domain single core IOPS refers to the system level IO operations per second that can be achieved using a single CPU core in that particular scaling domain.

Assume Domain 1 scalability with single-core IOPS $X_{D1}$ and parallel fraction $p_{D1}$ and Domain 2 with single-core IOPS $X_{D2}$ and parallel fraction $p_{D2}$. As used herein, Domain 1 scalability single-core IOPS is also referenced using the notation $X_{D1}(1)$ to represent a single core performance value for the first scaling domain. The notation can generally refer to a measure of system level IOPS (X) for the first scaling domain (D1) where the performance value measures performance for a single CPU core (n=1). Similarly, Domain 2 scalability single-core IOPS is also referenced using the notation $X_{D2}(1)$ to represent a single core performance value for the second scaling domain. This notation can generally refer to the measure of system level IOPS (X) for the second scaling domain (D2) where the performance value measures performance for a single CPU core. The parallel fractions for the first scaling domain, Domain 1, and the second scaling domain, Domain 2, can also be referred to herein as $p_{D1}$ and $p_{D2}$, respectively.

Assume N is the total number of cores, and n is the number of cores allocated for the first scaling domain, Domain 1 (D1). Let $X_{D1}(n)=S_{D1}(n)X_{D1}(1)$, where $X_{D1}(n)$ is system-level IOPS that can be achieved with n Domain 1 cores, $X_{D1}(1)$ represents a single core performance value, e.g., system level IOPS supported by a single Domain 1 core, and $S_{D1}(n)$ represents Amdahl's speedup for a number n of Domain 1 cores, as follows:

$$S_{D1}(n) = \frac{n}{p_{D1} + (1 - p_{D1})n} \tag{3}$$

In Equation (3), $p_{D1}$ is the parallel fraction representing the parallelizable portion of the code path in the first scaling domain, Domain 1.

In Equation (4), the performance value $X_{D1}(n)$ for the number n of CPU cores in the first scaling domain is given by the following expression:

$$X_{D1}(n) = \frac{n}{p_{D1} + (1 - p_{D1})n} X_{D1}(1) \tag{4}$$

In particular, the performance value $X_{D1}(n)$ for the number n of CPU cores in the first scaling domain can be derived based on system performance measurements, as discussed in connection with FIG. 4. In example embodiments, the system performance measurements can include the single core performance value $X_{D1}(1)$, the number n of CPU cores in the first scaling domain, and the parallel fraction $p_{D1}$ for the first scaling domain (such as an expression inverting the parallel fraction $p_{D1}$ for the first scaling domain).

Similarly, for the second scaling domain, Domain 2 (D2), with the remaining number, N−n, of CPU cores allocated, then the performance value $X_{D2}(N-n)$ for the remaining number, N−n, of CPU cores in the second scaling domain is given by Equation (5) as follows:

$$X_{D2}(N-n) = \frac{N-n}{p_{D2} + (1 - p_{D2})(N-n)} X_{D2}(1) \tag{5}$$

Similar to the first scaling domain, the performance value $X_{D2}(N-n)$ for the general remaining number, $N-n$, of CPU cores in the second scaling domain can be derived based on system performance measurements. In example embodiments, the system performance measurements can include the single core performance value $X_{D2}(1)$, the remaining number, $N-n$, of CPU cores in the second scaling domain, and the parallel fraction $p_{D2}$ for the second scaling domain (such as an expression inverting the parallel fraction $p_{D2}$ for the second scaling domain).

Equation (6) presumes the CPU core portioning to be optimal so as to arrive at an initial equation yielding the number n of CPU cores in the first scaling domain, as follows:

$$X_{D1}(n) = X_{D2}(N-n) \quad (6)$$

Substituting Equations (4) and (5) into Equation (6) yields the following expression:

$$\frac{n}{p_{D1} + (1-p_{D1})n} X_{D1}(1) = \frac{N-n}{p_{D2} + (1-p_{D2})(N-n)} X_{D2}(1) \quad (7)$$

It is appreciated that Equation (7) can be rearranged into Equation (8). In example embodiments, Equation (8) includes a standard form quadratic equation with a single variable, n, representing a recommended number n of CPU cores for allocation to Domain 1. In some embodiments, the recommended number n can represent an optimal number of CPU cores in Domain 1.

$$An^2 + Bn + C = 0 \quad (8)$$

where $$A = (1-p_{D1}) - \frac{X_{D1}(1)}{X_{D2}(1)}(1-p_{D2}) \quad (9)$$

$$B = \frac{X_{D1}(1)}{X_{D2}(1)} p_{D2} + p_{D1} - NA \quad (10)$$

$$C = -Np_{D1} \quad (11)$$

Equation (8) yields at most two quadratic solutions in the form given by Equation (12), as follows:

$$n = \frac{-B \pm \sqrt{B^2 - 4AC}}{2A} \quad (12)$$

Accordingly, the single variable, n, can be obtained by solving a quadratic equation generated from the parallel fraction and performance value in each scaling domain. In example embodiments, Equations (9), (10), (11), and (12) can be solved based on measurements of basic system performance. A corresponding quadratic solution can represent a recommended number n of CPU cores to allocate to the first scaling domain, Domain 1. In particular, Equation (12) yields at most two quadratic solutions, and the integer approximation of the quadratic solution in the range $1 \leq n < N$ (e.g., where n is a whole number between 0 and N) can represent the recommended core partitioning. For example, the recommended core partitioning can include allocating a number, n, of CPU cores to Domain 1 and the remaining number, $N-n$, CPU core to Domain 2.

Example

To illustrate CPU core partitioning among a first scaling domain and a second scaling domain, an example of a system with 64 CPU cores will now be discussed, with measured speedup characteristics and scalability parameters represented in the following Table 1:

TABLE 1

| Domain 1 | | Domain 2 | |
|---|---|---|---|
| $X_{D1}(1)$ | $p_{D1}$ | $X_{D2}(1)$ | $p_{D2}$ |
| 10,000 | 0.99 | 8,000 | 0.93 | where the single core performance value $X_{D1}(1)$ represents the system level IOPS supported by a single core in Domain 1, the single core performance value $X_{D2}(1)$ represents the system level IOPS supported by a single core in Domain 2, $p_{D1}$ is the parallel fraction representing the parallelizable portion of the code path in Domain 1, and $p_{D2}$ is the parallel fraction representing the parallelizable portion of the code path in Domain 2. $X_{D1}(1)$, $X_{D2}(1)$, $p_{D1}$, and $p_{D2}$ can generally be derived based on measurements of basic system performance as discussed above, for example using linear regression of trial runs of the application in the given scaling domain. As mentioned, the system has 64 CPU cores, yielding a total number N=64 of CPU cores.

Using Equations (9), (10), (11), and (12) as discussed in connection with FIG. 5 yields the following values in Table 2:

TABLE 2

| N= | 64 |
|---|---|
| A= | −0.0775 |
| B= | 7.1125 |
| C= | −63.36 |
| $n_{D1}(1)$ | 10.00 |
| $n_{D1}(2)$ | 81.78 |

In Table 2, $n_{D1}(1)$ and $n_{D1}(2)$ represent the two quadratic solutions of the quadratic equation, e.g., embodied in Equations (9), (10), (11), and (12). The number n of CPU cores for the first scaling domain D1 can be calculated based on the quadratic solution that is between 1 and the total number N of CPU cores (here, N=64). As mentioned, the number n of CPU cores can be an integer approximation based on $n_{D1}(1)$ or $n_{D1}(2)$ (for example, a whole number that is rounded based on the particular quadratic solution $n_{D1}(1)$ and $n_{D1}(2)$). Only $n_{D1}(1)$ is in the meaningful range (e.g., less than the total number N of CPU cores in the system), so allocating ten CPU cores to Domain 1 and the remaining number 54 (=64−10) of the CPU cores to Domain 2 will result in the recommended system performance.

Figure 6:
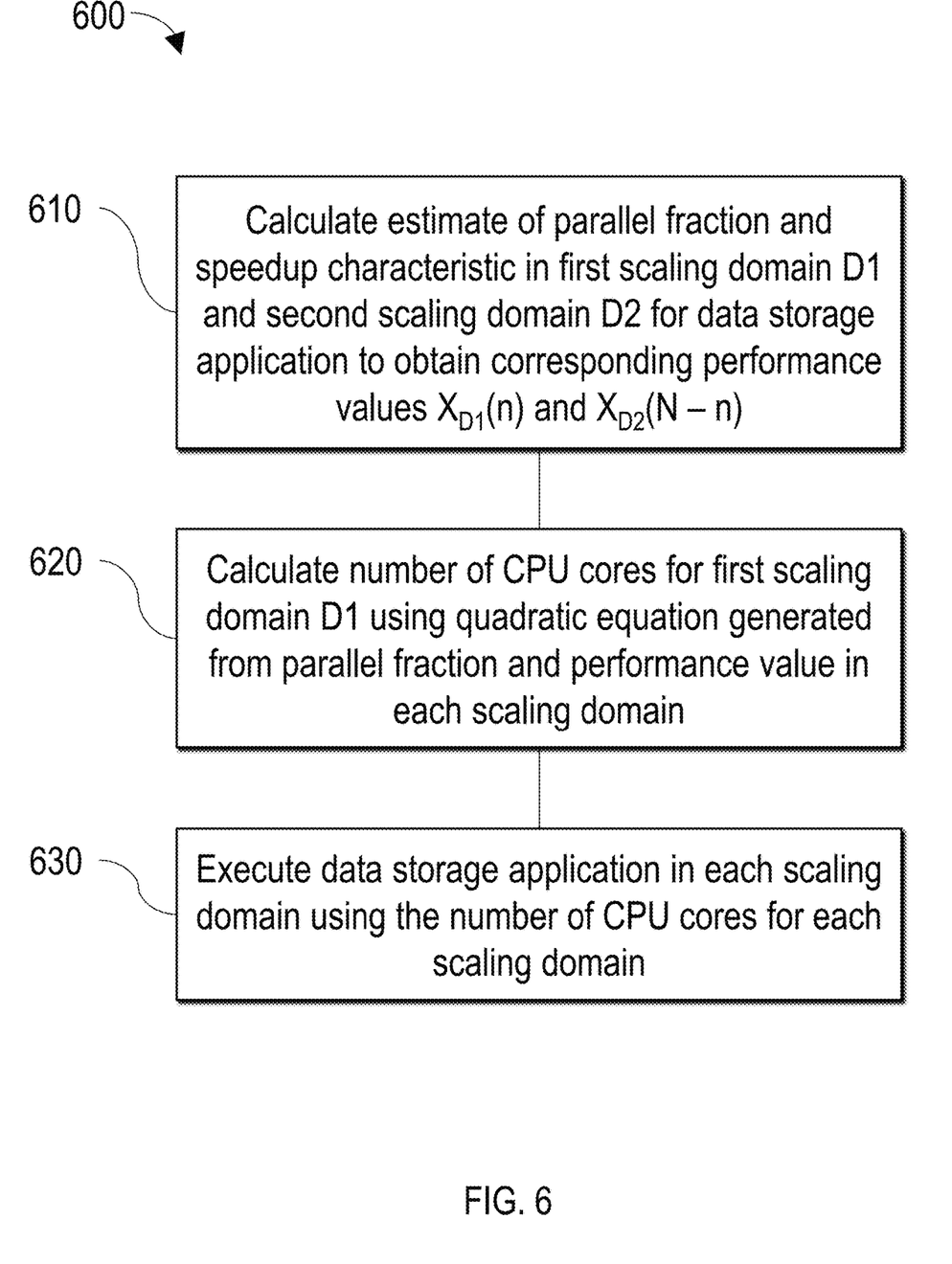
FIG. 6 illustrates aspects of a method, in accordance with example embodiments.

FIG. 6 shows a method 600, in accordance with example embodiments. For example, the method 600 can be for tuning performance of a computer system (e.g., system 110).

In example embodiments, the method 600 can be performed by the performance analyzer 120.

In example embodiments, the method 600 includes calculating an estimate of parallel fraction and speedup characteristic in a first scaling domain D1 and in a second scaling domain D2 for an application executed by a computer system (step 610). For example, the estimate can be calculated using system performance measurements generated from previous processing iterations of one or more workloads using a number, n, of CPU cores in the first scaling domain and a remaining number, N−n, of CPU cores in the second scaling domain, to obtain corresponding performance values $X_{D1}(n)$ and $X_{D2}(N-n)$, where N represents a total number of CPU cores. In some embodiments, the performance value for the first scaling domain $X_{D1}(n)$ is determined based on system performance measurements including the parallel fraction for the first scaling domain and the single core performance value for the first scaling domain $X_{D1}(1)$. The performance value for the second scaling domain $X_{D2}(N-n)$ is determined based on system performance measurements including the parallel fraction for the second scaling domain and the single core performance value for the second scaling domain $X_{D2}(1)$. The estimate can be calculated using linear regression of values $(1/n, 1/X_{Di}(n))$ generated from trial runs of the application in a given scaling domain. The calculating the estimate of parallel fraction and speedup characteristic can be based on an expression relating speedup to an inverse of a parallel fraction for the application in a given scaling domain. The parallel fraction can represent a fraction of the application that can be executed in parallel. The calculating the estimate of parallel fraction and speedup characteristic can be further based on an inversion of the expression that yields a linear expression for $1/X_D(n)$ in terms of $1/n$. The linear expression can have slope and intercept values identified by the linear regression and used in substitution calculations to obtain the parallel fraction and a single-core performance value in a given scaling domain. The substitution calculations can include (1) calculating the single-core performance value as $1/(m+b)$, m being the slope value and b being the intercept value, and (2) calculating the parallel fraction as $m/(m+b)$. The parallel fractions in the first and the second scaling domains can be estimated using system performance measurements generated from trial runs of the application processing the workloads by selecting a fixed number of CPU cores in a given scaling domain and varying the remaining number of CPU cores in the other scaling domain to obtain the parallel fraction in the other scaling domain. The performance values can be values of input/output operations per second (IOPS) as a performance metric for the application. The performance values $X_{D1}(n)$ and $X_{D2}(N-n)$ can be scaled values calculated by normalizing raw performance values with respect to CPU utilization achieved in the respective scaling domains during respective trials of the application. The CPU cores can be a plurality of cores in one or more CPUs.

In example embodiments, the method 600 includes calculating the number of CPU cores for the first scaling domain (step 620). For example, the number of CPU cores can be calculated using a quadratic equation generated from the parallel fraction and performance value in each scaling domain. In some embodiments, the quadratic equation relates the single core performance value for the first scaling domain with n cores allocated, to the single core performance value for the second scaling domain with the remaining N−n cores allocated. The quadratic equation can yield at most two quadratic solutions, and the number of CPU cores for the first scaling domain is calculated based on the quadratic solution that is between 1 and the total number N of CPU cores. The calculated number of CPU cores can represent an optimal number of CPU cores for the first scaling domain.

In example embodiments, the method 600 includes executing the application in each scaling domain using the number of CPU cores for each scaling domain (step 630).

While the various steps in the example method 600 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 600 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

As mentioned, at least portions of the system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

Illustrative embodiments of processing platforms will now be described in greater detail with reference to FIG. 7. Although described in the context of the system 100, these platforms may also be used to implement at least portions of other information processing systems in other embodiments.

Figure 7:
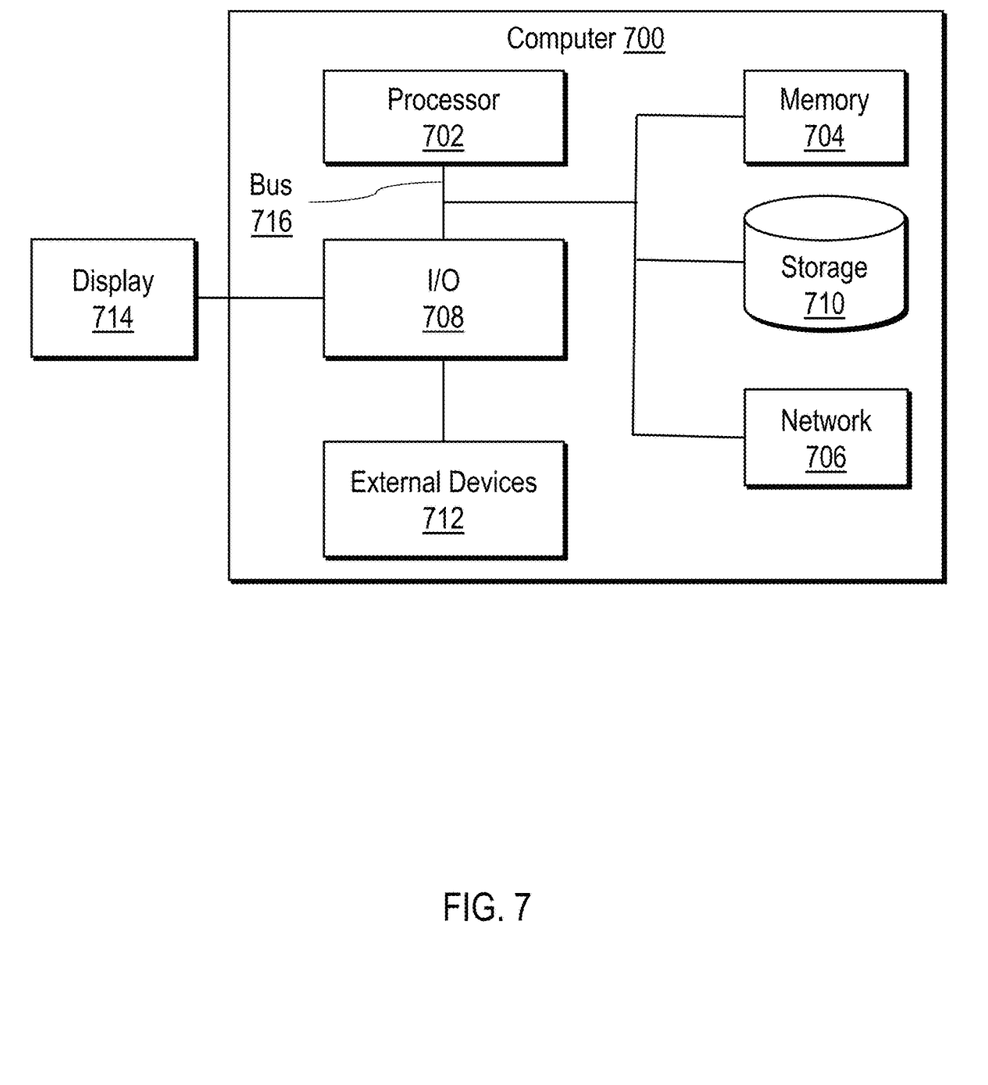
FIG. 7 illustrates aspects of a computing device or computing system, in accordance with example embodiments.

FIG. 7 illustrates aspects of a computing device or a computing system in accordance with example embodiments. The computer 700 is shown in the form of a general-purpose computing device. Components of the computer may include, but are not limited to, one or more processors or processing units 702, a memory 704, a network interface 706, and a bus 716 that communicatively couples various system components including the system memory and the network interface to the processor.

The bus 716 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 700 typically includes a variety of computer-readable media. Such media may be any available media that is accessible by the computer system, and such media includes both volatile and non-volatile media, removable and non-removable media.

The memory 704 may include computer system readable media in the form of volatile memory, such as random-access memory (RAM) and/or cache memory. The computer system may further include other removable/non-removable, volatile/non-volatile computer system storage media. By way of example only, the storage system 710 may be provided for reading from and writing to a non-removable, non-volatile magnetic media (not shown and typically called a "hard drive") in accordance with the present RAID techniques. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 716 by one or more data media interfaces. As has been depicted and described above in connection with FIGS. 1-6, the memory may include at least one computer program product having a set (e.g., at least one) of program modules that are configured to carry out the functions of the embodiments as described herein.

The computer 700 may also include a program/utility, having a set (at least one) of program modules, which may be stored in the memory 704 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 700 may also communicate with one or more external devices 712 such as a keyboard, a pointing device, a display 714, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 708. Still yet, the computer system may communicate with one or more networks such as a local area network (LAN), a general wide area network (WAN), and/or a public network (e.g., the Internet) via the network adapter 706. As depicted, the network adapter communicates with the other components of the computer system via the bus 716. It should be understood that although not shown, other hardware and/or software components could be used in conjunction with the computer system. Non-limiting examples include microcode, device drivers, redundant processing units, external disk drive arrays, RAID systems, tape drives, data archival storage systems, and the like.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In the foregoing description of FIGS. 1-7, any component described with regard to a figure, in various embodiments of the invention, may be equivalent to one or more like-named components described with regard to any other figure. For brevity, descriptions of these components has not been repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n.". This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A system comprising:
at least one processing device including a processor coupled to a memory;
the at least one processing device being configured to:
calculate an estimate of parallel fraction and speedup characteristic in a first scaling domain D1 and in a second scaling domain D2 for an application executed by a computer system, the estimate being calculated using system performance measurements generated from previous processing iterations of one or more workloads of the application using a number, n, of CPU cores in the first scaling domain and a remaining number, N−n, of CPU cores in the second scaling domain to obtain corresponding performance values $X_{D1}(n)$ and $X_{D2}(N-n)$, wherein N represents a total number of CPU cores;
calculate the number of CPU cores for the first scaling domain, the number of CPU cores being calculated using a quadratic equation generated from the parallel fraction and performance value in each scaling domain; and
execute the application in each scaling domain using the number of CPU cores for each scaling domain.

2. The system of claim 1,
wherein the performance value for the first scaling domain $X_{D1}(n)$ is determined based on system performance measurements including the parallel fraction for the first scaling domain and a single core performance value for the first scaling domain $X_{D1}(1)$, and
wherein the performance value for the second scaling domain $X_{D2}(N-n)$ is determined based on system performance measurements including the parallel fraction for the second scaling domain and a single core performance value for the second scaling domain $X_{D2}(1)$.

3. The system of claim 2, wherein the quadratic equation relates the single core performance value for the first scaling domain with n number of cores allocated, to the single core performance value for the second scaling domain with the remaining number N−n of cores allocated.

4. The system of claim 3, wherein the quadratic equation yields at most two quadratic solutions, and the number of CPU cores for the first scaling domain is calculated based on the quadratic solution that is between 0 and the total number N of CPU cores.

5. The system of claim 1, wherein the estimate is calculated using linear regression of values $(1/n, 1/X_D(n))$ generated from trial runs of the application in a given scaling domain.

6. The system of claim 1, wherein the estimate of parallel fraction and speedup characteristic is calculated based on an expression relating speedup to an inverse of a parallel fraction for the application in a given scaling domain, the parallel fraction being a fraction of the application that can be executed in parallel.

7. The system of claim 6, wherein the estimate of parallel fraction and speedup characteristic is calculated further based on an inversion of the expression that yields a linear expression for $1/X_D(n)$ in terms of $1/n$, the linear expression having slope and intercept values identified by a linear regression and used in substitution calculations to obtain the parallel fraction and a single-core performance value in a given scaling domain.

8. The system of claim 7, wherein the substitution calculations include (1) calculating the single-core performance value as $1/(m+b)$, m being the slope value and b being the intercept value, and (2) calculating the parallel fraction as $m/(m+b)$.

9. The system of claim 1, wherein the parallel fractions in the first and the second scaling domains are estimated using system performance measurements generated from trial runs of the application processing the workloads by selecting a fixed number of CPU cores in a given scaling domain among the first and the second scaling domain and varying the remaining number of CPU cores in another scaling domain among the first and the second scaling domain to obtain the parallel fraction in the other scaling domain.

10. The system of claim 1, wherein the performance values are values of input/output operations per second (IOPS) as a performance metric for the application.

11. The system of claim 1, wherein the performance values $X_{D1}(n)$ and $X_{D2}(N-n)$ are scaled values calculated by normalizing raw performance values with respect to CPU utilization achieved in the respective scaling domains during respective trials of the application.

12. The system of claim 1, wherein the CPU cores comprise a plurality of cores in one or more CPUs.

13. The system of claim 1, wherein the calculated number of CPU cores represents an optimal number of CPU cores for the first scaling domain.

14. A method comprising:
calculating an estimate of parallel fraction and speedup characteristic in a first scaling domain D1 and in a second scaling domain D2 for an application executed by a computer system, the estimate being calculated using system performance measurements generated from previous processing iterations of one or more workloads of the application using a number, n, of CPU cores in the first scaling domain and a remaining number, N−n, of CPU cores in the second scaling domain to obtain corresponding performance values $X_{D1}(n)$ and $X_{D2}(N-n)$, wherein N represents a total number of CPU cores;
calculating the number of CPU cores for the first scaling domain, the number of CPU cores being calculated using a quadratic equation generated from the parallel fraction and performance value in each scaling domain; and
executing the application in each scaling domain using the number of CPU cores for each scaling domain.

15. The method of claim 14,
wherein the performance value for the first scaling domain $X_{D1}(n)$ is determined based on system performance measurements including the parallel fraction for the first scaling domain and a single core performance value for the first scaling domain $X_{D1}(1)$, and
wherein the performance value for the second scaling domain $X_{D2}(N-n)$ is determined based on system performance measurements including the parallel fraction for the second scaling domain and a single core performance value for the second scaling domain $X_{D2}(1)$.

16. The method of claim 15, wherein the quadratic equation relates the single core performance value for the first scaling domain with n number of cores allocated, to the single core performance value for the second scaling domain with the remaining number N−n of cores allocated.

17. The method of claim 16, wherein the quadratic equation yields at most two quadratic solutions, and the number of CPU cores for the first scaling domain is calculated based on the quadratic solution that is between 0 and the total number N of CPU cores.

18. The method of claim 14, wherein the parallel fractions in the first and the second scaling domains are estimated using system performance measurements generated from trial runs of the application processing the workloads by selecting a fixed number of CPU cores in a given scaling domain among the first and the second scaling domain and varying the remaining number of CPU cores in another scaling domain among the first and the second scaling domain to obtain the parallel fraction in the other scaling domain.

19. The method of claim 14, wherein the calculated number of CPU cores represents an optimal number of CPU cores for the first scaling domain.

20. A non-transitory computer-readable storage medium having stored thereon program code of one or more software programs, wherein the program code when executed by at least one processing device causes the at least one processing device to perform the following steps:

calculating an estimate of parallel fraction and speedup characteristic in a first scaling domain D1 and in a second scaling domain D2 for an application executed by a computer system, the estimate being calculated using system performance measurements generated from previous processing iterations of one or more workloads of the application using a number, n, of CPU cores in the first scaling domain and a remaining number, N–n, of CPU cores in the second scaling domain to obtain corresponding performance values $X_{D1}(n)$ and $X_{D2}(N-n)$, wherein N represents a total number of CPU cores;

calculating the number of CPU cores for the first scaling domain, the number of CPU cores being calculated using a quadratic equation generated from the parallel fraction and performance value in each scaling domain; and executing the application in each scaling domain using the number of CPU cores for each scaling domain.

* * * * *